(12) United States Patent
Pereira et al.

(10) Patent No.: US 12,412,945 B2
(45) Date of Patent: Sep. 9, 2025

(54) BATTERY ASSEMBLY FOR ELECTRIC VEHICLE

(71) Applicant: SABIC Global Technologies B.V., Bergen op Zoom (NL)

(72) Inventors: Carlos Pereira, Putnam Valley, NY (US); Dinesh Munjurulimana, South Lyon, MI (US); Anil Tiwari, Maastricht (NL); Dhanendra Kumar Nagwanshi, Novi, MI (US); Curtis Steven Collar, Moorestown, NJ (US)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 720 days.

(21) Appl. No.: 17/760,510

(22) PCT Filed: Jun. 26, 2020

(86) PCT No.: PCT/EP2020/068085
§ 371 (c)(1),
(2) Date: Mar. 15, 2022

(87) PCT Pub. No.: WO2021/069115
PCT Pub. Date: Apr. 15, 2021

(65) Prior Publication Data
US 2022/0263152 A1 Aug. 18, 2022

(30) Foreign Application Priority Data
Oct. 10, 2019 (EP) ..................................... 19202591

(51) Int. Cl.
*H01M 10/00* (2006.01)
*H01M 10/613* (2014.01)
(Continued)

(52) U.S. Cl.
CPC ..... *H01M 10/6551* (2015.04); *H01M 10/613* (2015.04); *H01M 10/625* (2015.04);
(Continued)

(58) Field of Classification Search
CPC ............. H01M 10/625; H01M 50/176; H01M 50/171; H01M 50/209
See application file for complete search history.

(56) References Cited

U.S. PATENT DOCUMENTS

| | | | |
|---|---|---|---|
| 2017/0259956 A1* | 9/2017 | Hori | ........................ F25B 21/04 |
| 2018/0205045 A1 | 7/2018 | Schroder et al. | |
| 2019/0296321 A1 | 9/2019 | Newman et al. | |

FOREIGN PATENT DOCUMENTS

EP   3340340 A1   6/2018

OTHER PUBLICATIONS

International Search Report and Written Opinion of the International Searching Authority for International Application No. PCT/EP2020/068085; International Filing Date Jun. 26, 2020; Date of mailing: Sep. 24, 2020; 11 pages.

* cited by examiner

*Primary Examiner* — Niki Bakhtiari
*Assistant Examiner* — Monique M Wills
(74) *Attorney, Agent, or Firm* — CANTOR COLBURN LLP

(57) ABSTRACT

A battery pack comprising: a battery comprising at least one battery cell, connectors and heat exchanger means, and a battery housing comprising: a bottom enclosure comprising at least a base and an upstanding peripheral wall, the bottom enclosure is suitable to contain the battery, a lid suitable for closing the bottom enclosure, and fixation means suitable to maintain the lid on the bottom enclosure in order to close the battery pack housing, characterized in that the lid comprises at least a protrusion, the protrusion is positioned in order to (Continued)

press the battery assembly towards the center of the module, wherein the battery is contained inside the bottom enclosure and the lid is covering the bottom enclosure and retained by the fixation means inside the battery housing, adjacent to the wall of the bottom enclosure and the battery.

20 Claims, 17 Drawing Sheets

(51) Int. Cl.
    *H01M 10/625*     (2014.01)
    *H01M 10/6551*     (2014.01)
    *H01M 50/171*     (2021.01)
    *H01M 50/176*     (2021.01)
    *H01M 50/209*     (2021.01)

(52) U.S. Cl.
    CPC ....... *H01M 50/171* (2021.01); *H01M 50/176* (2021.01); *H01M 50/209* (2021.01); *H01M 2220/20* (2013.01)

BATTERY ASSEMBLY FOR ELECTRIC VEHICLE

CROSS REFERENCE TO RELATED APPLICATIONS

This application is a National Stage application of PCT/EP2020/068085, filed Jun. 26, 2020, which claims the benefit of European Application No. 19202591.4, filed Oct. 10, 2019, both of which are incorporated by reference in their entirety herein.

TECHNICAL FIELD

The present invention relates to a battery pack, in particular a battery pack housing and a battery assembly, in particular a battery pack for electric vehicle.

BACKGROUND

One of the common designs of battery pack used by the automotive industry is the following: pouch type battery cells are stacked together alternatively with a heat exchanger unto two threaded rods, which thread into an end plate. At the end of the stack, another end plate is added and a bolt is threaded in to achieve a compression force.

Such a compression force on the battery cell is needed. Indeed, the compression force is required in order to counterbalance the 5-10% volumetric expansion of the cells during charging and through aging. Without such compression force, the lifetime of the battery module is shorter.

In addition, the automotive industry is actively looking for a new generation of batteries allowing an extended autonomy range, to achieve this goal, a criteria is to increase energy density.

A way to reach this goal is reducing the weight of the vehicle and in particular the battery pack assembly, including the battery modules and the vehicle battery pack frame. Currently, most vehicle batteries pack frames use aluminum or high strength steel designs. These designs provide structural integrity and protection during an impact, but they are heavy.

It would be desirable to provide a lightweight vehicle battery assembly that is capable of protecting and preserve the life span of battery pack.

SUMMARY

This object is achieved by the present invention. In a first aspect, the present invention relates to a battery pack module comprising: a battery comprising at least one battery cell, connectors and heat exchanger means, and a battery housing comprising: a bottom enclosure comprising at least a base and an upstanding peripheral wall, the bottom enclosure is suitable to contain the battery, a lid suitable for closing the bottom enclosure, and fixation means suitable to maintain the lid on the bottom enclosure in order to close the battery pack housing, characterized in that the lid comprises at least a protrusion, the protrusion is positioned in order to press the battery assembly towards the center of the module, wherein the battery is contained inside the bottom enclosure and the lid is covering the bottom enclosure and retained by the fixation means inside the battery housing, adjacent to the wall of the bottom enclosure and the battery. This can reduce the inner volume of the bottom enclosure available to the battery, and putting pressure on the battery pack toward the center of the battery pack module.

In another embodiment, the battery housing may comprise thermal transfer means configured to dissipate the heat coming from the battery to the external environment of the battery pack.

In another embodiment, the wall of the bottom enclosure can be either twin walled or single walled where by a twin walled enclosure can be used to allow circulation of a cooling fluid between the two walls.

In another embodiment, the bottom enclosure may comprise at least one housing for the battery connectors in order to secure the battery and it elements inside the battery pack.

In another embodiment, a sealant may be placed between the lid and the bottom enclosure in order to achieve a seal, preferentially the sealant is an elastomeric O-ring.

In another embodiment, the battery housing may be made of thermoplastic material.

In another embodiment, the battery pack may comprise a negative terminal and a positive terminal accessible from outside of the housing in order to use the battery pack as a standalone power source supply or check its state of charge.

Another aspect the present invention is an electric vehicle battery assembly comprising at least: a Battery pack module according to various examples, a frame comprising spars configured to maintain at least the battery pack, a top cover, and a bottom cover.

In another embodiment, the electric vehicle battery assembly may comprise a thermal management system, preferentially a liquid or air heat exchanger positioned between the bottom cover and the bottom enclosure of the battery pack, more preferentially the thermal management system interfaces with the thermal transfer means of the battery pack in order to dissipate the heat coming from the battery.

In another embodiment, the frame of the electric vehicle battery assembly may comprise at least shock and impact absorption means, preferentially these shock and impact absorption means may be included inside of the lateral spars or over molded on it.

In another embodiment, the shock and impact absorption means may be thermoplastic alveolar structural parts, metallic crush elements, and/or structural foams.

In another embodiment, the bottom cover may comprise at least a thermoplastic part assembled to a metallic plate which is exposed to the road, in order to form a hybrid bottom cover configured to protect the assembly from projections and obstacles from the road.

In another embodiment, the thermoplastic part of the bottom cover may have an alveolar structural portion comprising columns that extend between the top and bottom cover or in parallel fashion to the top and/or bottom cover, thereby the alveolar structural portion is configured to reduce heat propagation from the battery pack module and/or the thermal management system to others part members of the electric vehicle battery assembly.

In another embodiment, top cover may comprise ribs and/or edge in order to increase its stiffness.

Another aspect the present invention is a vehicle comprising a battery pack or an electric vehicle battery assembly according to various examples.

DETAILED DESCRIPTION

The term "xEV" is defined herein to include all of the following vehicles, or any variations or combinations thereof, that use electric power for all or a portion of their vehicular motive force. As will be appreciated by those skilled in the art, hybrid electric vehicles (HEV s) combine an internal combustion engine propulsion system and a battery powered electric propulsion system.

The term HEV may include any variation of a hybrid electric vehicle, such as micro-hybrid and mild hybrid systems, which disable the internal combustion engine when the vehicle is idling and utilize a battery system to continue powering the air conditioning unit, radio, or other electronics, as well as to kick-start the engine when propulsion is desired. The mild hybrid system may apply some level of power assist to the internal combustion engine, whereas the micro-hybrid system may not supply power assist to the internal combustion engine.

A plug-in electric vehicle (PEV) is any vehicle that can be charged from an external source of electricity, such as wall sockets, and the energy stored in the rechargeable battery packs drives or contributes to drive the wheels. PEVs are a subcategory of electric vehicles that include all-electric or battery electric vehicles (BEVs), plug-in hybrid vehicles (PHEV s), and electric vehicle conversions of hybrid electric vehicles and conventional internal combustion engine vehicles.

An electric vehicle (EV) is an all-electric vehicle that uses one or more motors powered by electric energy for its propulsion.

As described in more detail below, disclosed herein are embodiments of battery housing systems that may be used to compress one or more battery cells and that may be well suited to xEV applications.

The term "battery" is defined herein to include all kind of batteries, preferentially but not limited lithium ion batteries, in particular the one comprising pouch battery cell(s), which may undergo swelling due to the buildup of pressure within the cell. Swelling may result in shifting of the internal components of the pouch cells. For example, the electrode of the pouch cell may separate, degrading the chemical properties of the prismatic cell. Further, uncontrolled swelling of the pouch cells may drastically decrease their efficiency and product life. Accordingly, it would be desirable to provide compression to the pouch cells to protect their chemical integrity, and thus their efficiency and product life.

The preferred embodiment of a battery suitable to be housed in the battery pack housing according to various examples, comprising at least one battery cells, preferentially two or more battery cells, connectors and heat exchanger means.

The term "battery pack" is defined herein to include a battery housing containing a battery according to various examples.

The term "Electric vehicle battery assembly" is defined herein to include at least a battery pack surrounded by a frame to maintain it, a top cover and a bottom cover.

Battery

Figure 1A:
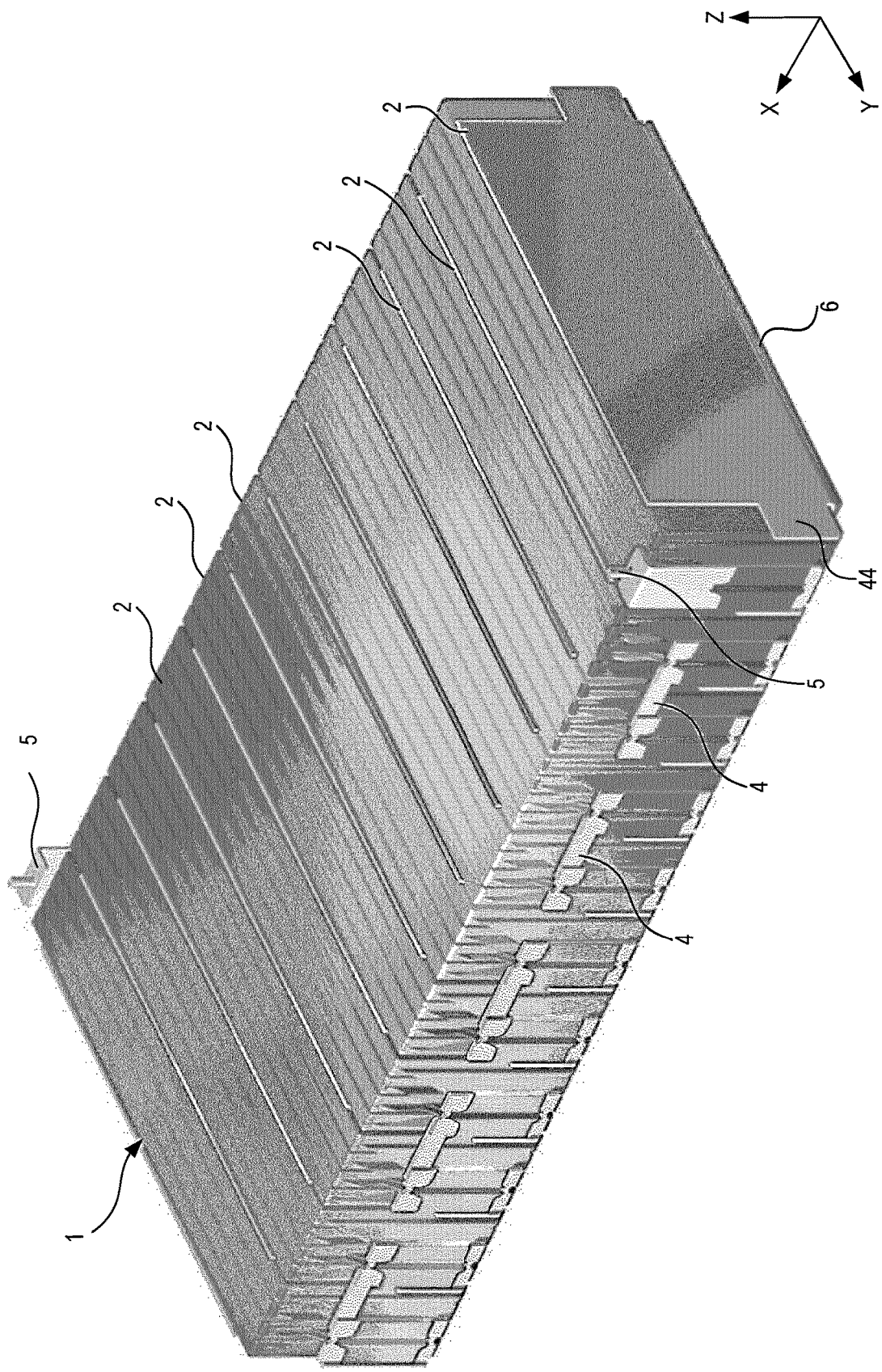
FIGS. 1A to 1C illustrate a battery, as defined under in various examples.
Figure 1B:
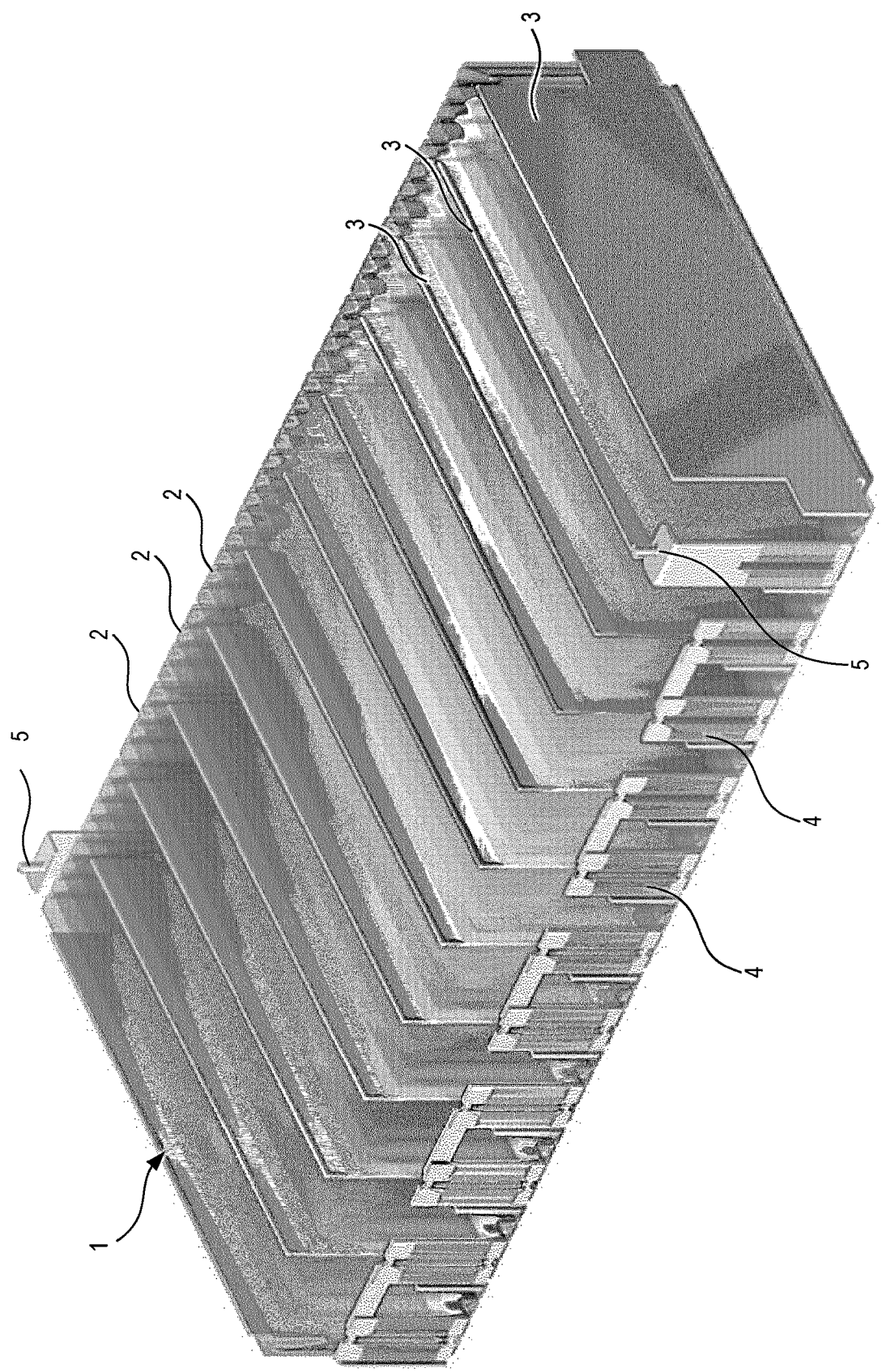
Figure 1C:
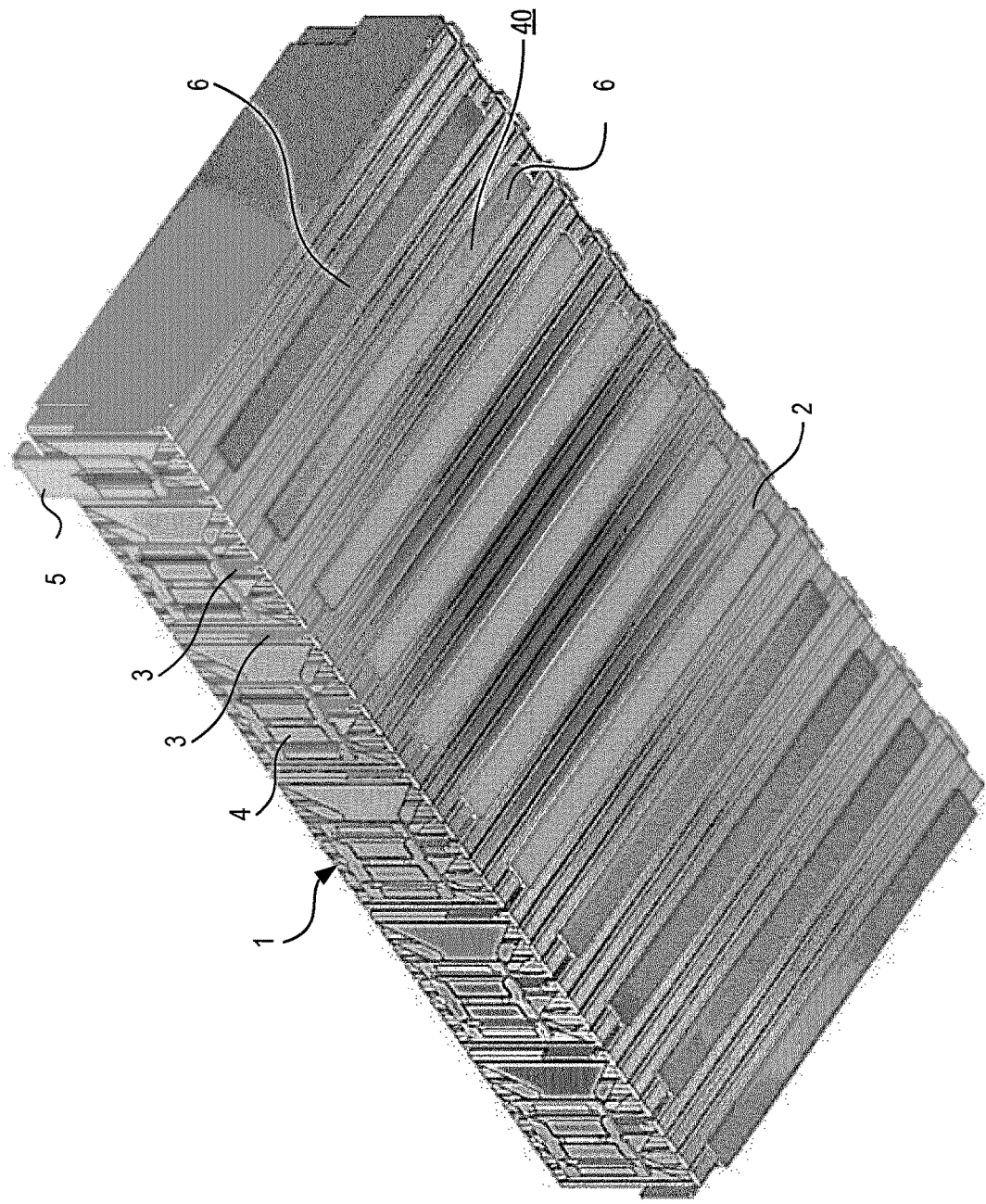

As described above, and shown by the FIGS. 1A to 1C, preferentially a battery (1) can comprise at least one battery cells (2). The battery (1) can preferentially include more than two battery cells, for example 10, 20 30, 40 or more battery cells, stacked together, with some heat exchanger mean(s) (3) placed between each battery cells (2). Although the present cells are prismatic, other cells are possible, such as jelly roll cells, such as the 18650-style cell. The cells (2) can be couple together electrically, and or thermally through busbar connections (4), which can be formed of copper or another suitable material.

"Heat exchanger means" is defined herein to include any kind of means suitable to transfer heat from the battery cell to an external environment. In some embodiments, the heat exchanger means (3) can be a metallic plate. The heat exchanger means (3) can be aluminum plates. The plate can be hollow or solid. Hollow heat exchanger means (3) can include one or more lumens. Lumens can function to lightweight a battery (1) and/or direct a coolant such as gas or liquid coolant. The heat exchanger means (3) can include a serpentine tube. The heat exchanger means can comprise any combination of these structures, or benefit from other means know by those having skill in the art. The heat exchanger means comprises an interface member (6) with the exterior environment. The interface member (6) can comprise a heat sink having an exposed surface (40).

The heat exchanger means are disposed between cells and provide for thermal transport of heat energy from the cells (2) and into the heat exchanger means (3). As disclosed herein, the heat exchanger means (3) can include features (44) such as ears to constrain movement of the heat exchanger means (3) along the X-axis, such as when the heat exchanger means (3) is disposed in a slot (42) of the thermal transfer means (13).

Battery Housing

Figure 2A:
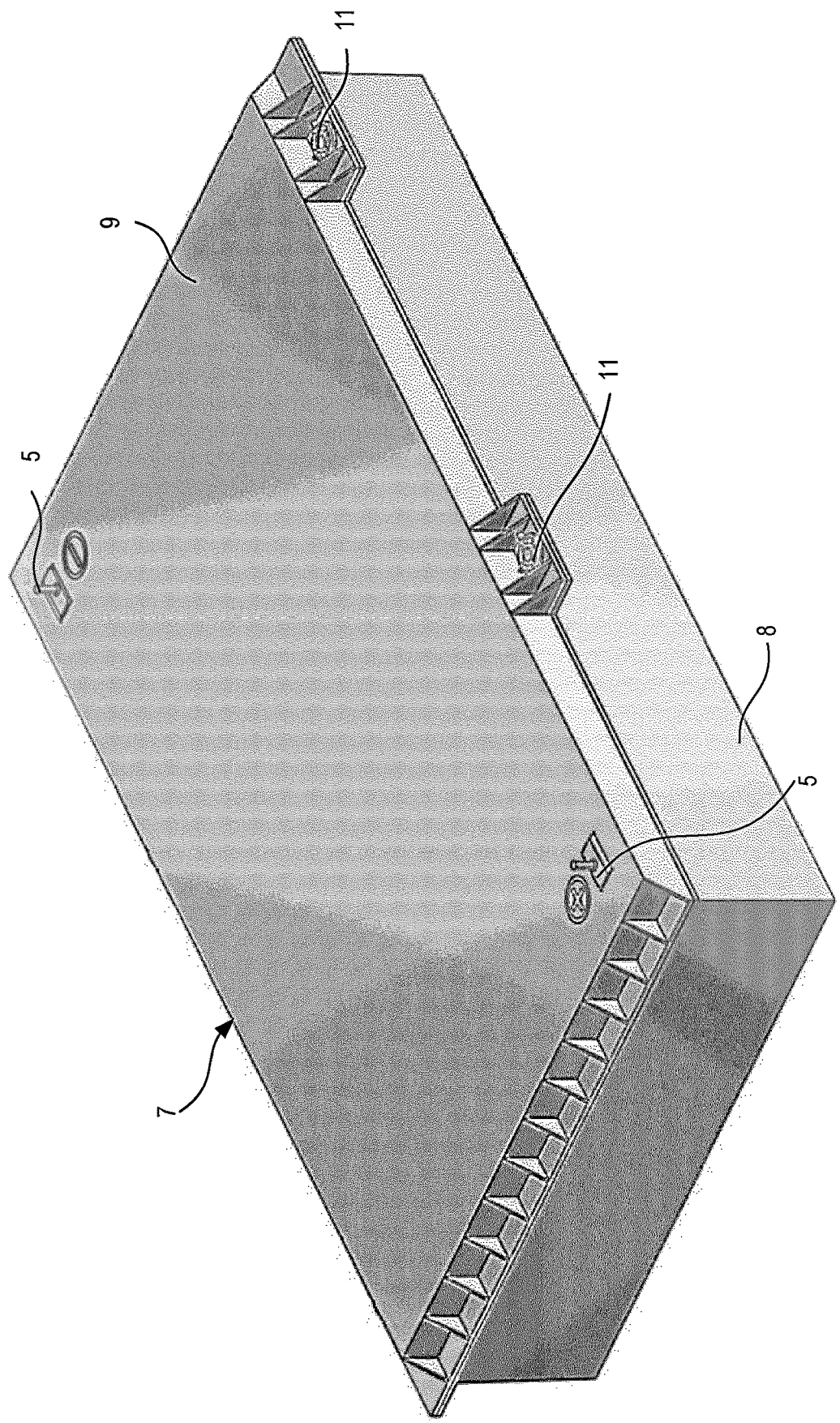
FIGS. 2A to 2C illustrate an embodiment of a battery housing according to various examples.
Figure 2B:
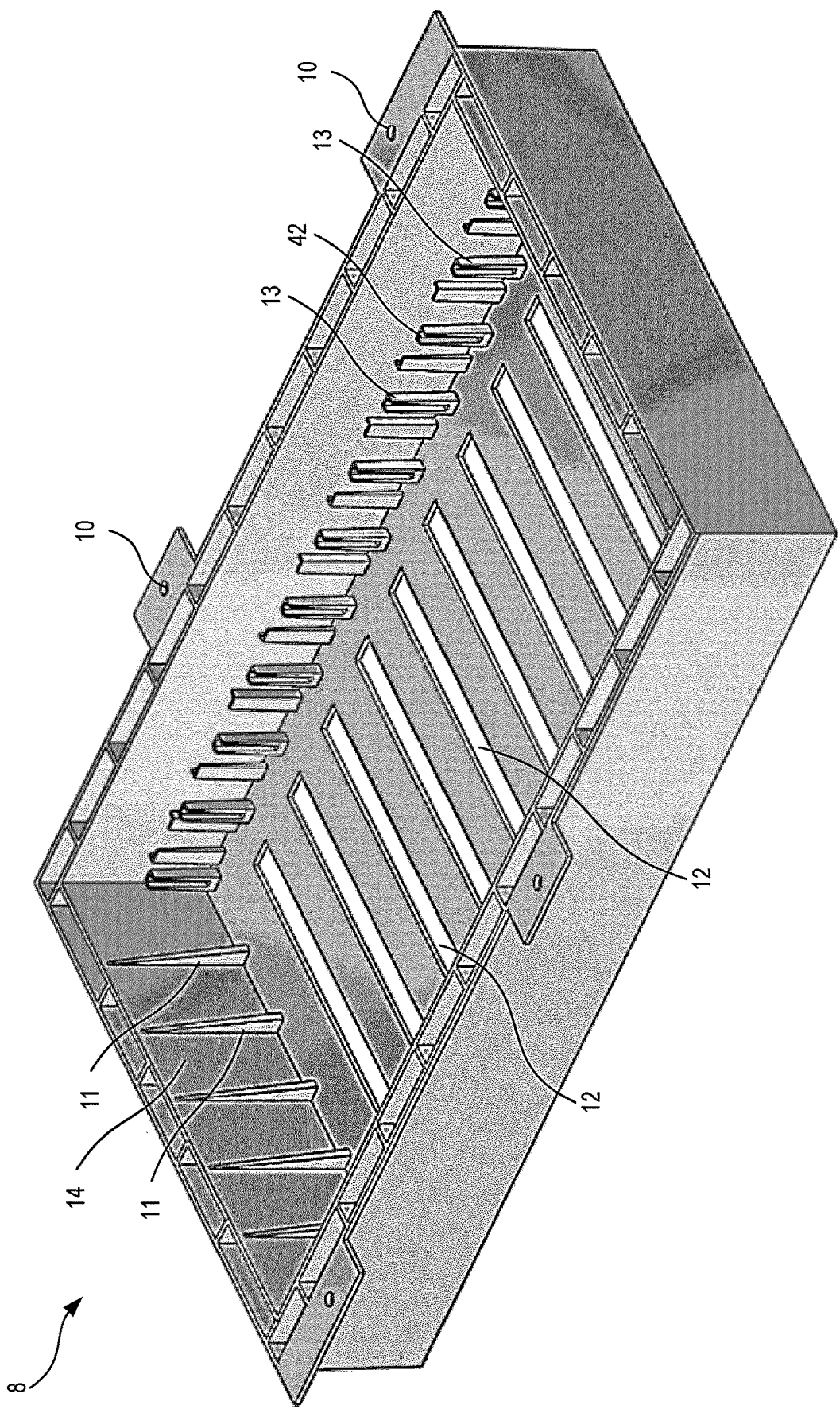
Figure 2C:
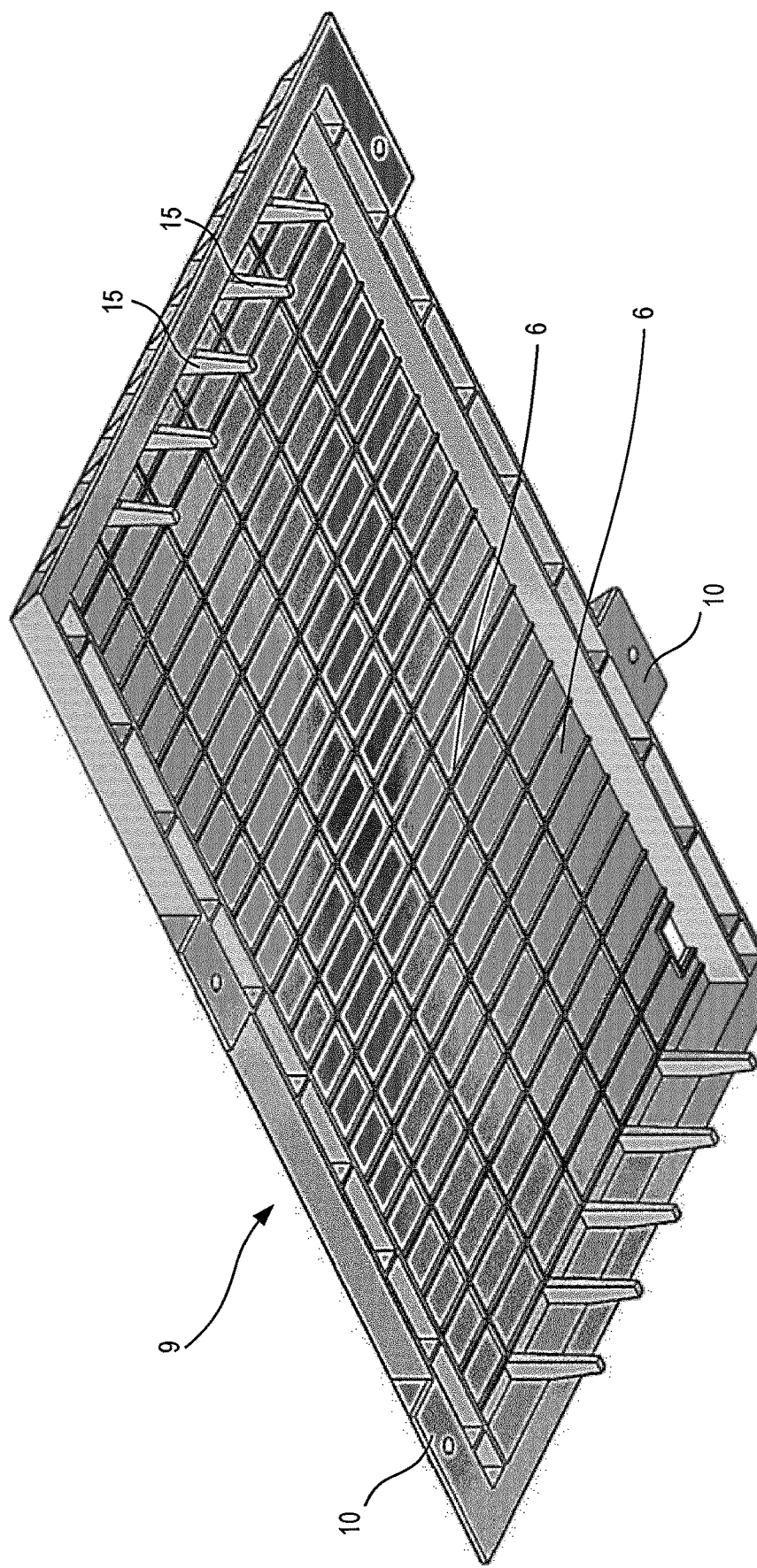
Figure 3:
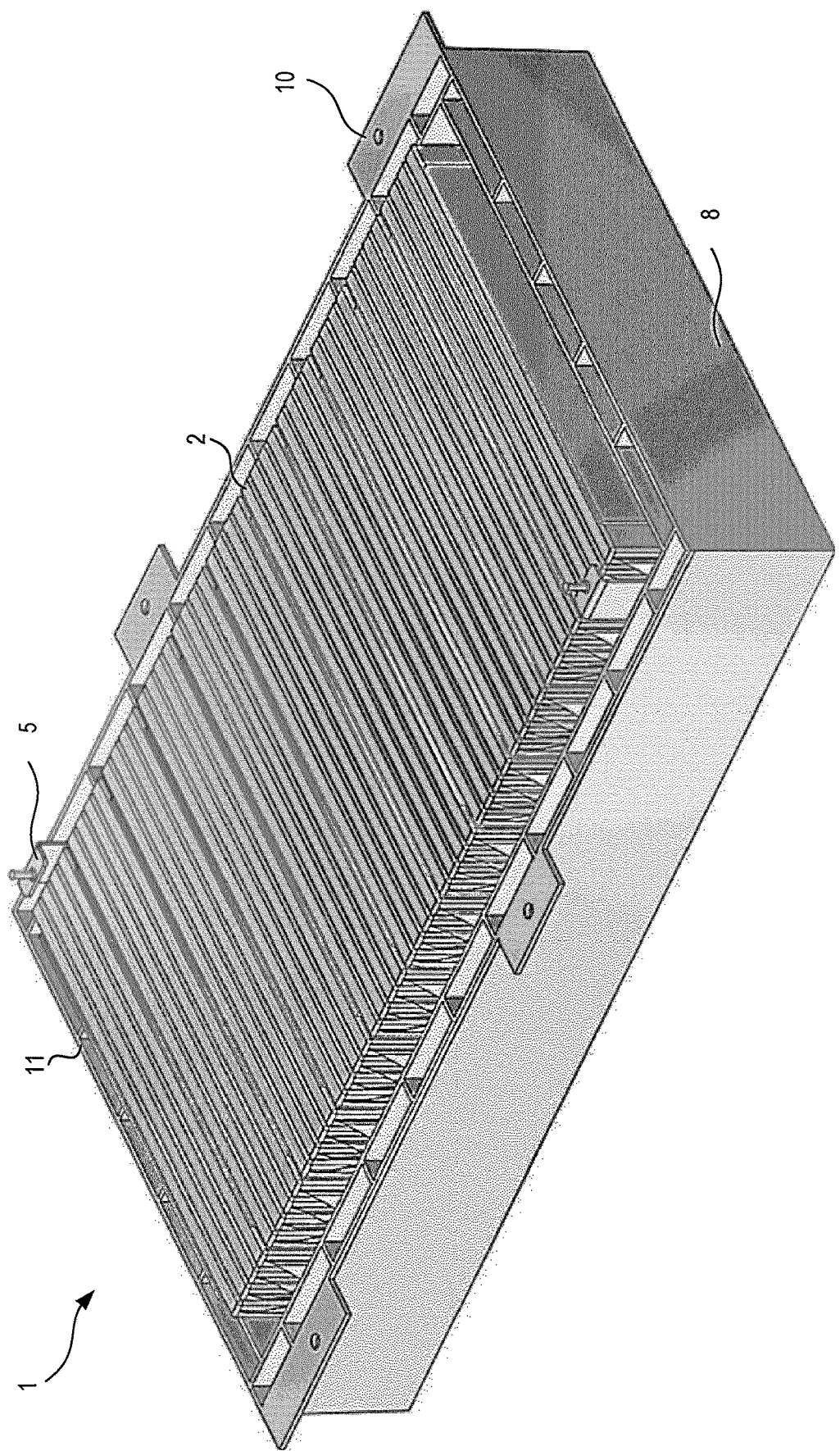
FIG. 3 illustrates an embodiment of bottom housing according to various examples, with the battery illustrated by FIGS. 1A to 1C optionally disposed therein.

According to some examples, and illustrated as an example by the FIGS. 2A to 2C, a battery housing (7) can comprise at least a bottom enclosure (8) comprising at least a base and an upstanding peripheral wall (14), suitable to contain the battery (1) as shown by FIG. 3. A battery housing (7) can include a lid (9) suitable for closing the bottom enclosure (8), and fixation means (10) suitable to maintain the lid (9) on the bottom enclosure (8) in order to close the battery pack housing (7). Depending of the embodiment, the base can have any kind of shape. It can be round, triangular, polygonal, preferentially rectangular.

The lid (9) comprises at least a protrusion (15) directed toward the base of the bottom enclosure (8), and can be placed in contact with at least a portion (11) of the bottom enclosure wall (14) when the lid (9) is closing the housing (7).

It is this cooperation between the at least a protrusion (15) and the at least a portion (11) of the wall (14), which creates a pressure on the battery cells (2) toward the center of the assembly of the battery (1) due to a reduction of the inner volume of the bottom enclosure (8) available to the battery (1).

This pressure is enough to counterbalance the 5-10% volumetric expansion of the cells and preserves the life span of battery pack. The protrusion (15) can be a single large rib covering the entire width or a part of the wall, or separate fingers that press areas of the wall, or a peripheral skirt that extends around the wall, or a combination of the above or any other means know by the skilled in the art.

In a preferred embodiment, the wall (14) have at least one rib (11) more preferentially several ribs (11), extending toward the center of the housing, with which the protrusion(s) (15) of the lid (9) is in contact when the lid (9) is closing the housing (7) in order to press the cells of the battery (1) towards the center of the assembly or module.

Figure 4A:
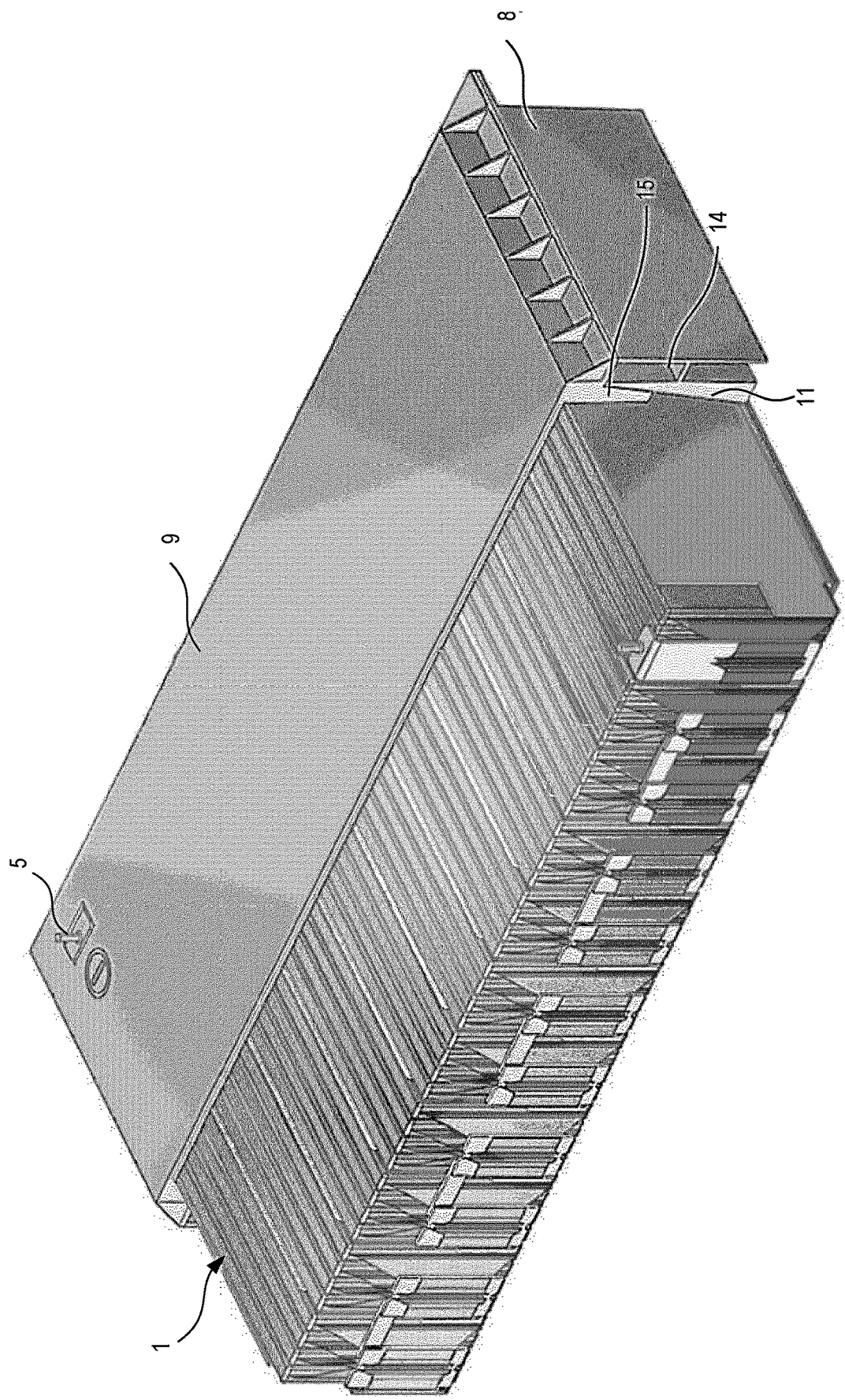
FIGS. 4A and 4B illustrate an embodiment of a battery pack or battery module according to various examples in which a part of the housing has been cut in order to see the cooperation between the lid and the bottom enclosure of the housing.
Figure 4B:
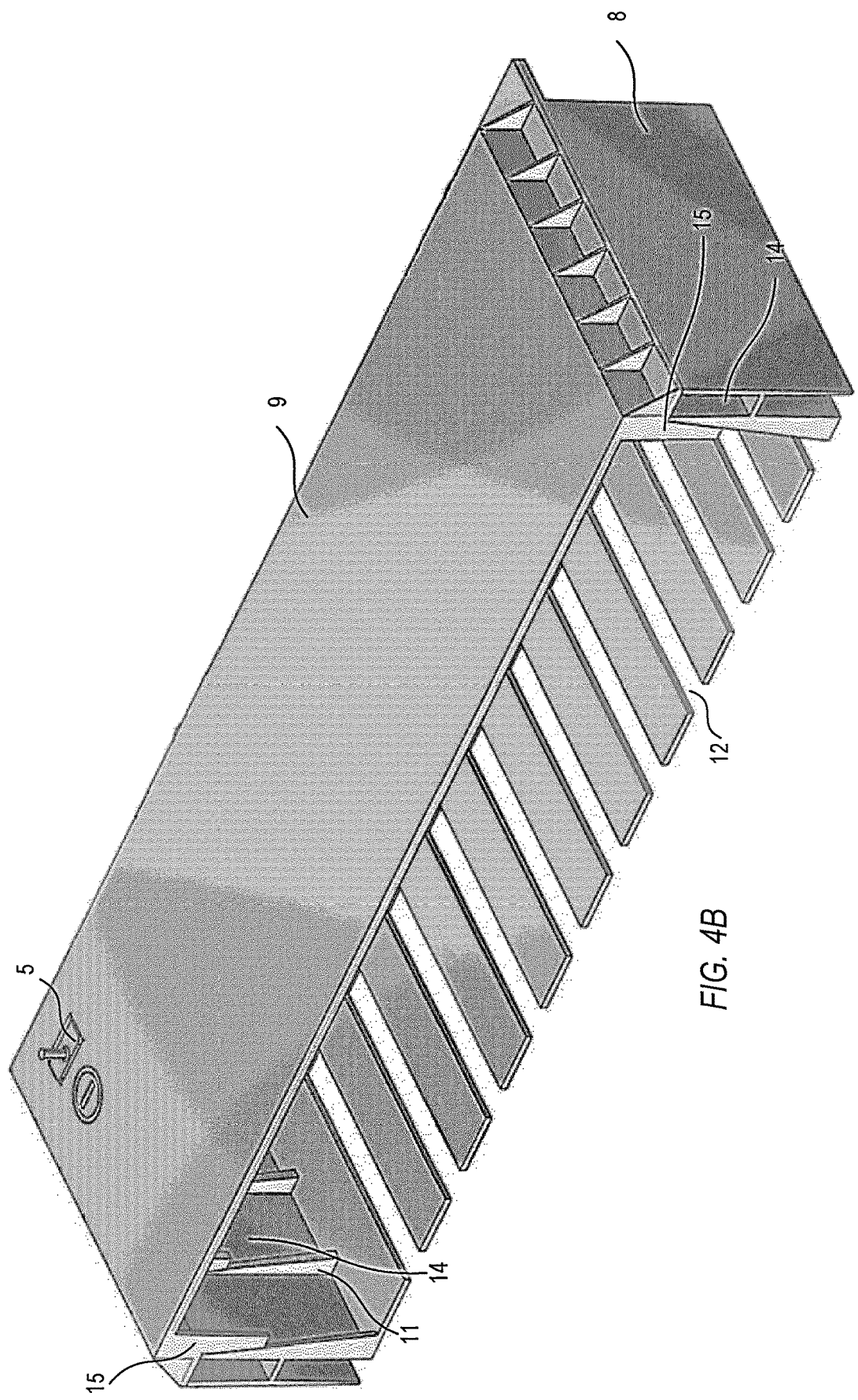

In some embodiments, the shape of the wall (14) (or the wall rib(s) (11)) and the protrusion (15) are complementary, for example conical, in order to facilitate the closing and locking of the housing (7) as show in the FIGS. 4A and 4B.

The fixation means (10) can apply enough resistance in order to avoid lid (9) separation from the bottom house (8) due the pressure exceed by the expansion of the battery on the protrusion (15) and the wall (14). The fixation means (10) can be a couple of screw-bolt, rivet or any another fastens or other means know by the skilled in the art.

In some embodiments, the fixation means (10) are positioned in some lip extending perpendicular to the wall (14). In some embodiments, the housing (7) comprises thermal transfer means (13) configured to dissipate the heat coming from the battery (1) to the external environment of the battery pack. One thermodynamic mode by which thermal energy can transfer from a battery cell (2), to a heat exchanger means (3), to a heat transfer means (13), and to an interface member (6) is conduction.

A thermal transfer means (13) can cooperate with the heat exchanger means (3) from the battery (1). They can abut and can be placed in thermal conduction. In some examples, a thermal interface material or thermal paste can be disposed between the thermal transfer means (13) and the heat exchanger means (3). In some embodiments, the thermal transfer means (13) can be a heat conductive material in contact with a part of the heat exchanger of the battery, for example an interface member which can be deformed due to the heat expansion so as to improve thermal contact of the surfaces, or one or several openings or slots (42) in the housing (7), in particular for example at the bottom enclosure (8) allowing a part of the battery heat exchanger (3), for example an interface member (6) access to the exterior environment of the battery housing (7), or a combination of the above or any other means know by the skilled in the art.

In some embodiments, the bottom enclosure (8) and/or the lid (9) are twin walled or single walled. A twin walled housing can provide more stiffness to the housing, in particular when such housing is in plastic material. In addition, a twin walled housing can be easier to mold as one limitation of injection molding is the maximal thickness of the wall. Indeed, a wall with a thickness higher than 4 mm can bring some issues during the injection molding cooling phase as it will not be uniform.

Furthermore, another advantage of a twin walled housing is that it can be used to allow circulation of a cooling fluid between the two walls. In this embodiment, the twin walled housing will have some inlet and outlet in order to have a cooling fluid as a liquid or gas circulating between the walls.

In some embodiments, the bottom enclosure (8) can comprise at least one heat exchanger means (13), such as a slotted receiver defining a slot 42, for the battery connectors, in order to secure the battery and its elements inside the battery pack.

In some embodiments, the lid (9) comprise one or more openings for terminals (5) for the battery terminals, in order to secure and allow the passage and direct access to the battery terminals. Thereby, when the housing (7) contains the battery (1), this ensemble also called battery pack or battery module (7B) can be used as a standalone power source supply.

In some embodiments, the battery housing (7) comprise a seal means is placed between the lid and the bottom enclosure in order to achieve a seal, preferentially the seal means is an elastomeric O-ring.

In some embodiments, the lid (9) and/or the bottom enclosure (8) is/are made of thermoplastic material, as for example polypropylene with low specific gravity or thermally conductive polycarbonate.

Some of the components of the battery pack, such as the frame (18), lid (9) and/or the bottom enclosure (8) are formed from at least one of the group including, UL94 V0 polyolefin compounds with high specific strength and specific stiffness, UL94 V0 high flow engineering thermoplastic compounds with good adhesive compatibility for thin gauge internal components, and any of a family of polyester compounds with low temperature ductility for impact absorbers.

In some embodiments, the lid (9) and/or the bottom enclosure (8) can comprise on one or both surface(s) some ribs (16) is order to increase the stiffness and its torsion resistance, preferentially in the inner surface.

Battery Assembly

Figure 5:
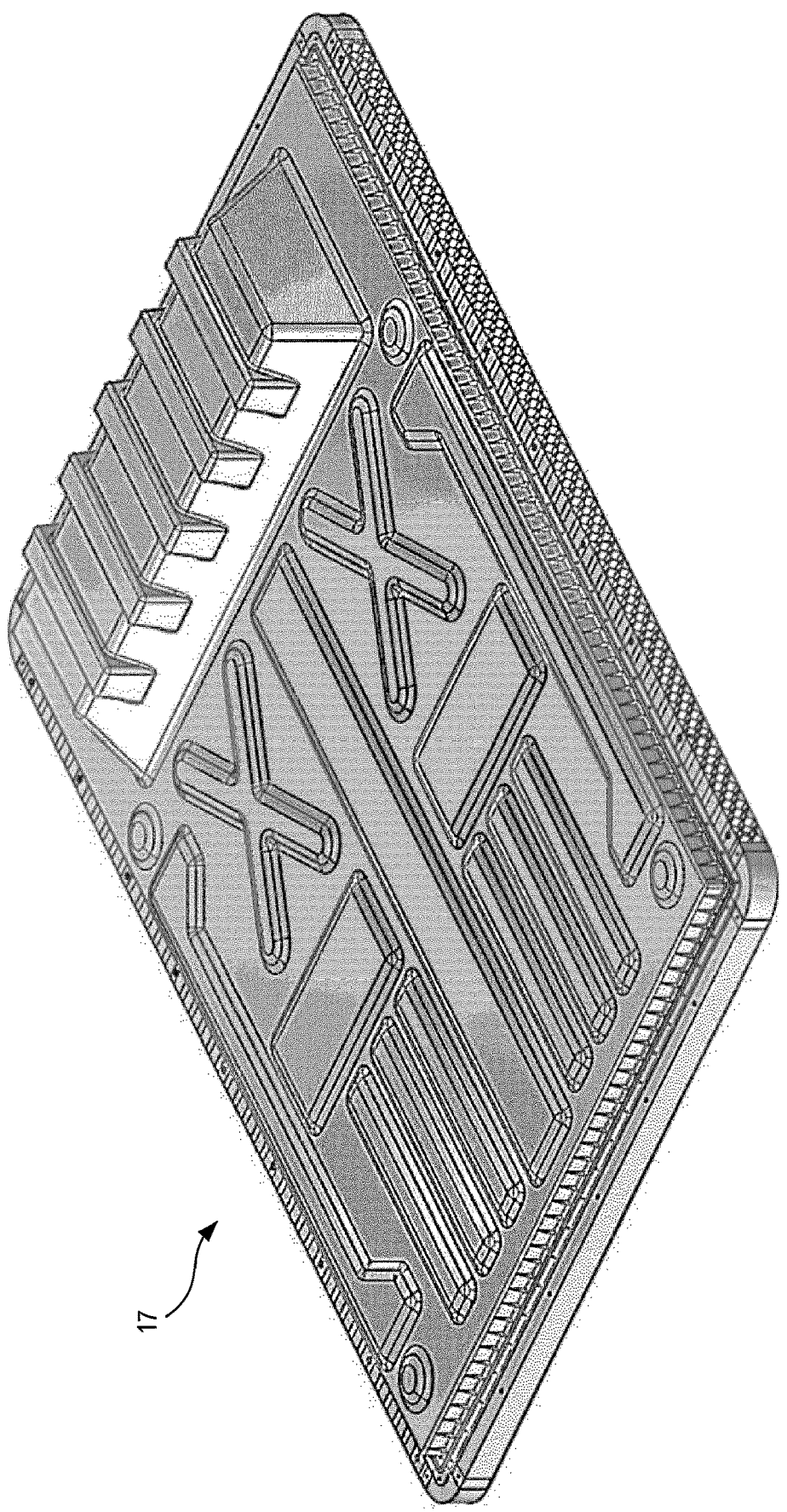
FIG. 5 illustrates an embodiment of a battery assembly suitable for a xElectric Vehicle (xEV) according to various examples.
Figure 6:
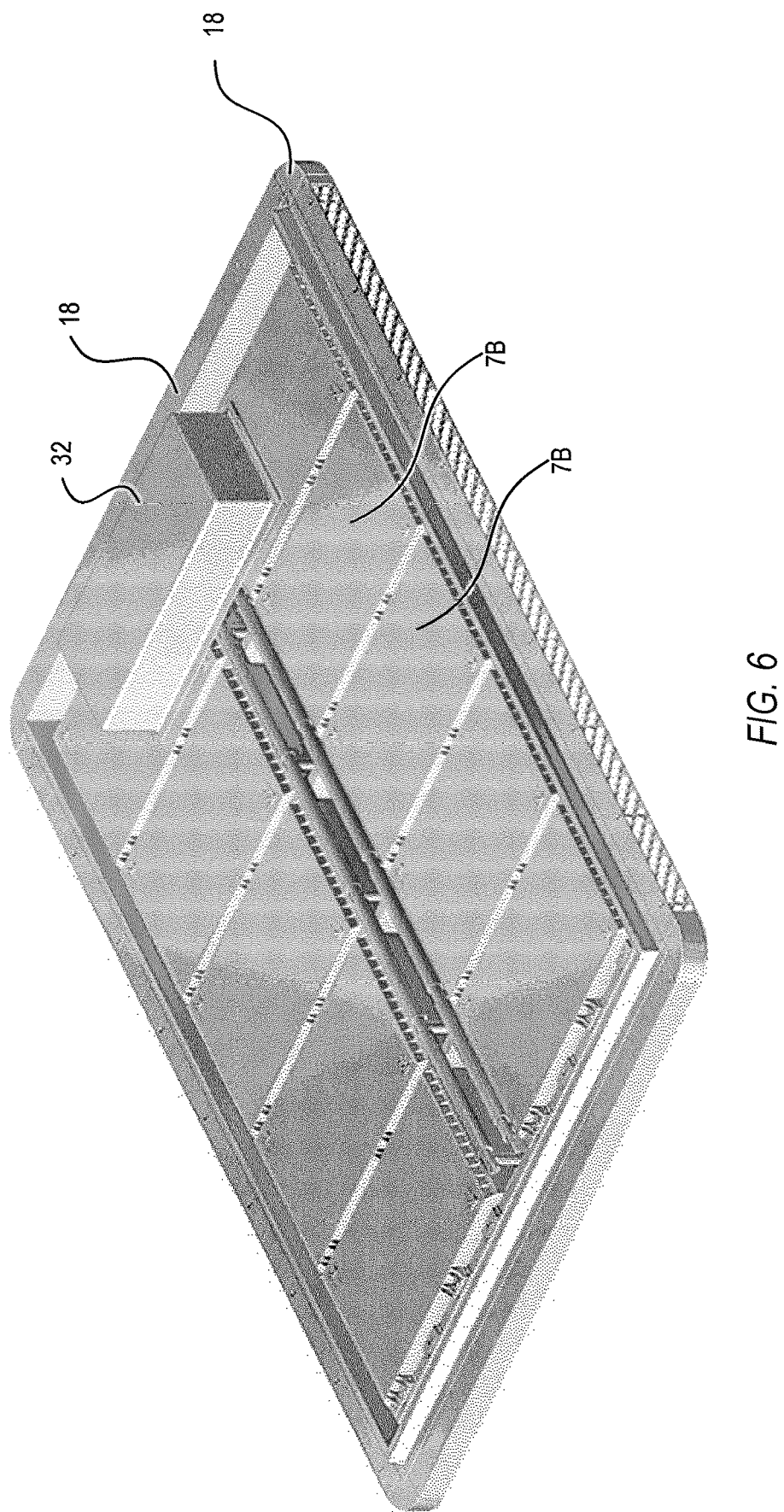
FIG. 6 illustrates an embodiment of a battery assembly suitable for a xElectric Vehicle (xEV) according to various examples, without the top cover.

FIGS. 5 and 6 disclose and example of a xEV battery assembly (17) according to various examples, in which the xEV battery assembly (17) comprises at least a battery pack module (7B) according to one of the preceding claims. The assembly can include pairs of battery packs (7B) numbering for example 2, 4, 6, 8 or 10, etc., a frame (18) comprising within it some spars (19) configured to maintain at least the battery pack (7B), a top cover (24), and a bottom cover (27). The assembly can include optionally one or more insulating material layers (26) between the components of the xEV battery assembly. The assembly can include a control module (32), configured in order to monitor each components of the battery assembly (17) and regulate the charge and discharge of battery assembly.

Figure 7:
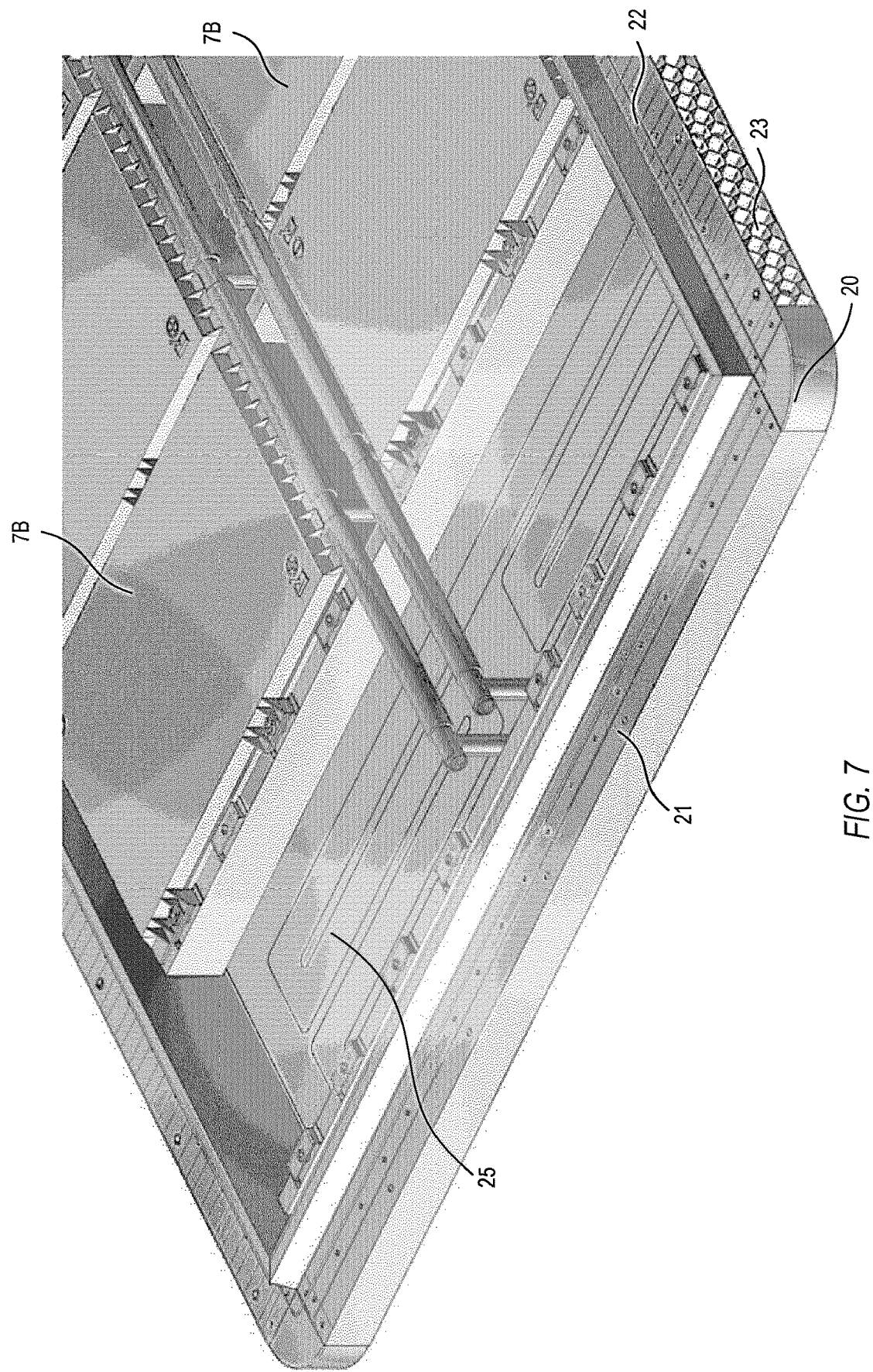
FIG. 7 illustrates an embodiment of a battery assembly according to various examples, where two battery packs or battery modules according to various examples has been removed.
Figure 8:
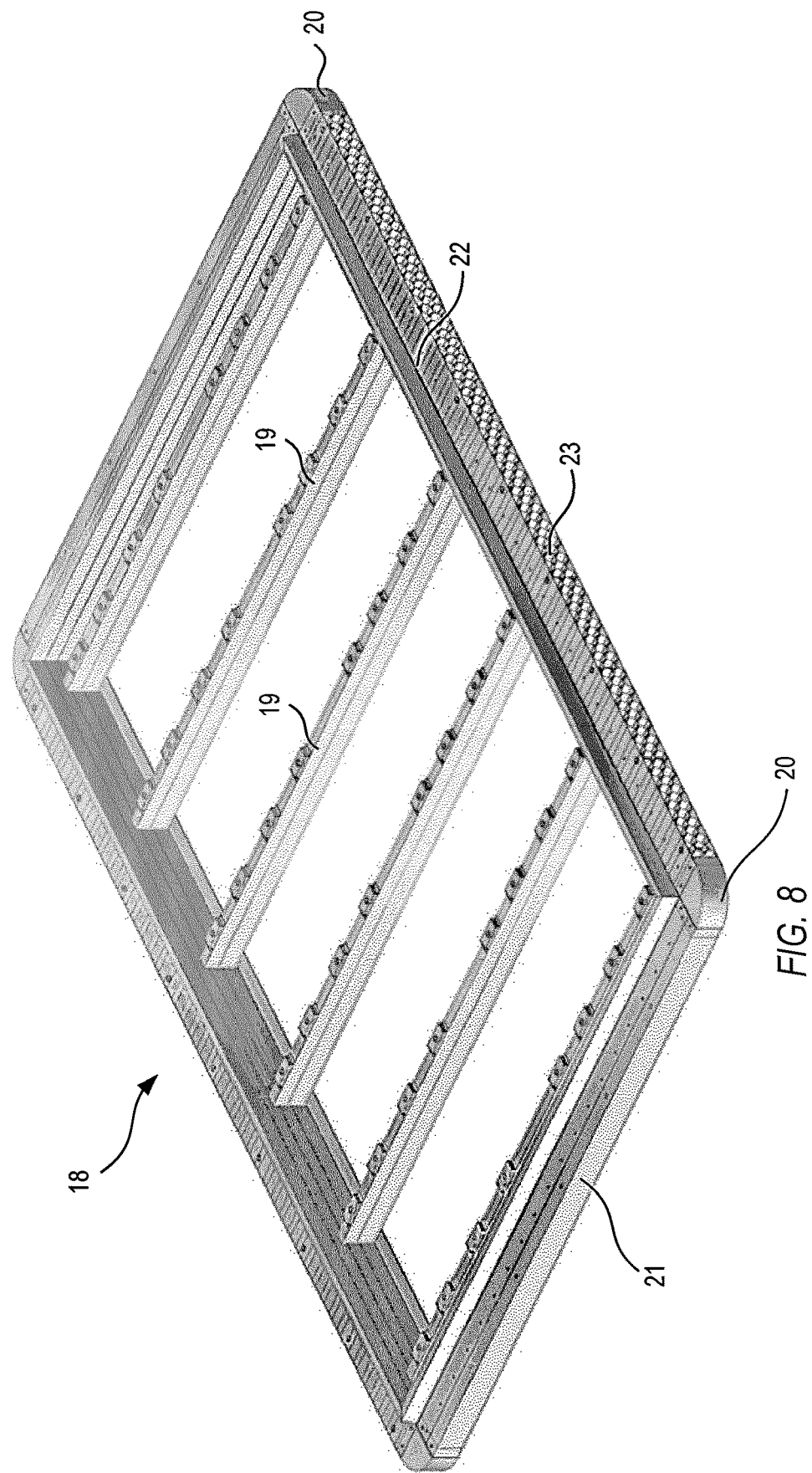
FIG. 8 illustrates an embodiment of a frame suitable for a battery assembly suitable for a xElectric Vehicle (xEV) according to various examples.

In some embodiments, as shown by the FIG. 8, the spars (19) can be regularly distributed within the frame, in order to flank one or more battery packs (7B) to physically constrain it. In some embodiments, the spars comprise a profile, which can cooperate with the fixation means (10) of the housing, in order to hold the battery pack (7B) with the frame (18) in reversible or non-reversible fashion, for example, such profile can be holes allowing the screw and bolt of the housing to place trough. Such design allows to change/replace individually each battery module (7B) independently of each other as show by the FIG. 7.

In some embodiments, the spars (18) are made of thermoplastic material, which can comprise a composite and/or a metal plastic hybrid. In some embodiments, the frame (18) can have any kind of shape. It can have a cross-section that is round, triangular, polygonal, preferentially rectangular. In some embodiments, the frame is made of one single piece, and is thus homogenous or monolithic. In some embodiments, the frame (18) is made of beams (21, 22) connected to each other by some connector means (20) for example die casted connectors. In some embodiments, the frame can be made in its whole or in parts in thermoplastic material, composite and/or metal. In some embodiments, the beams (21, 22) of the frame comprise at least a shock and impact absorption means (23).

"Shock and impact absorption means" is defined herein to include any kind of means suitable to absorb and distribute the energy coming from an impact in order to preserve or at least reduce the deformation of the battery assembly. Such shock and impact absorption means can be an alveolar structural portion, metallic crush elements, structural foams, or a combination of these or any other means know by the skilled in the art. The alveolar structural portion (23) can be formed by over molding using an injection molding process and hollow beam (21, 22), or be taken in sandwich between two "L shape" beams (21, 22).

The orientation of the alveolar structural portion (23) with respect to the channel in the beam (and also with respect to the opening through the beam) can also be chosen to attain desirable energy absorption characteristics. For example, the alveolar structural portion can form channels that can be oriented 0 degrees (e.g., parallel) to 90 degrees (perpendicular), to the major axis of the beam. In some embodiment the alveolar structural portion (23) can have a honeycomb and/or pillar (rectangle, triangle) shape.

Optionally, in some embodiments, some or all of the alveoli/channels (23) can have foam therein. In other words, the alveoli can, individually, be hollow or filled, such that the structural integrity can be modified by filling particular alveoli, by using different polymer for particular alveoli, or a combination comprising at least one of the foregoing. One possible fill material is foam.

Figure 9:
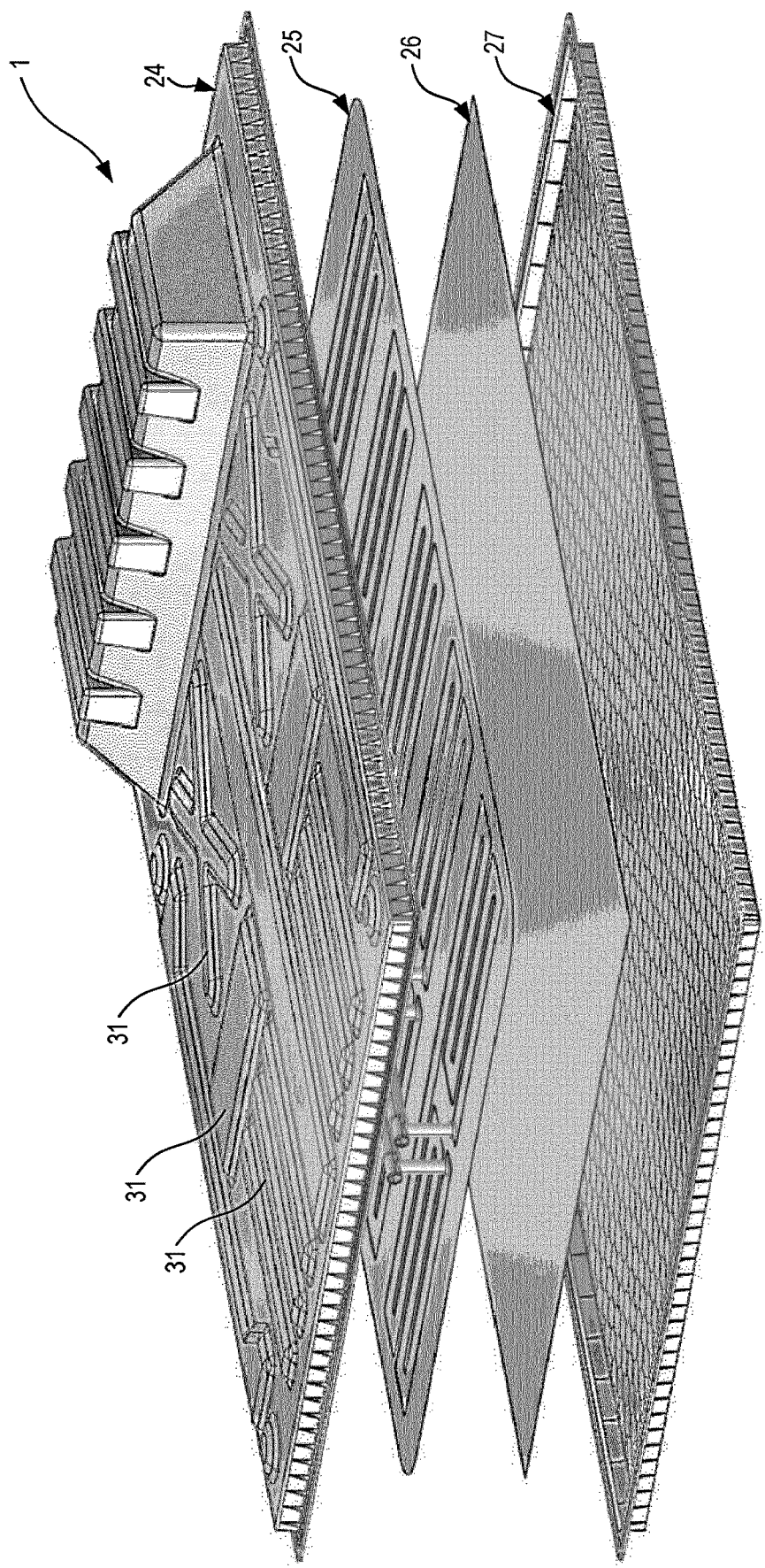
FIG. 9 illustrates an embodiment of the different parts composing a battery assembly suitable for a xElectric Vehicle (xEV) according to various examples, without the frame and the battery pack or battery module.

In some embodiments, as shown in FIG. 9, xEV battery assembly (17) may comprise a thermal management system (25) which can be in contact with heat transfer means (12) of the housing (7), in order to dissipate the heat coming from the battery (1).

Depending of the embodiment, such thermal management system (25) can be a liquid or air heat exchanger positioned between the bottom cover (27) and the bottom enclosure (8) of the battery pack (7B). Optionally, an additional insulating material (26) can be placed between the bottom cover (27) and the thermal management system (25).

Figure 10A:
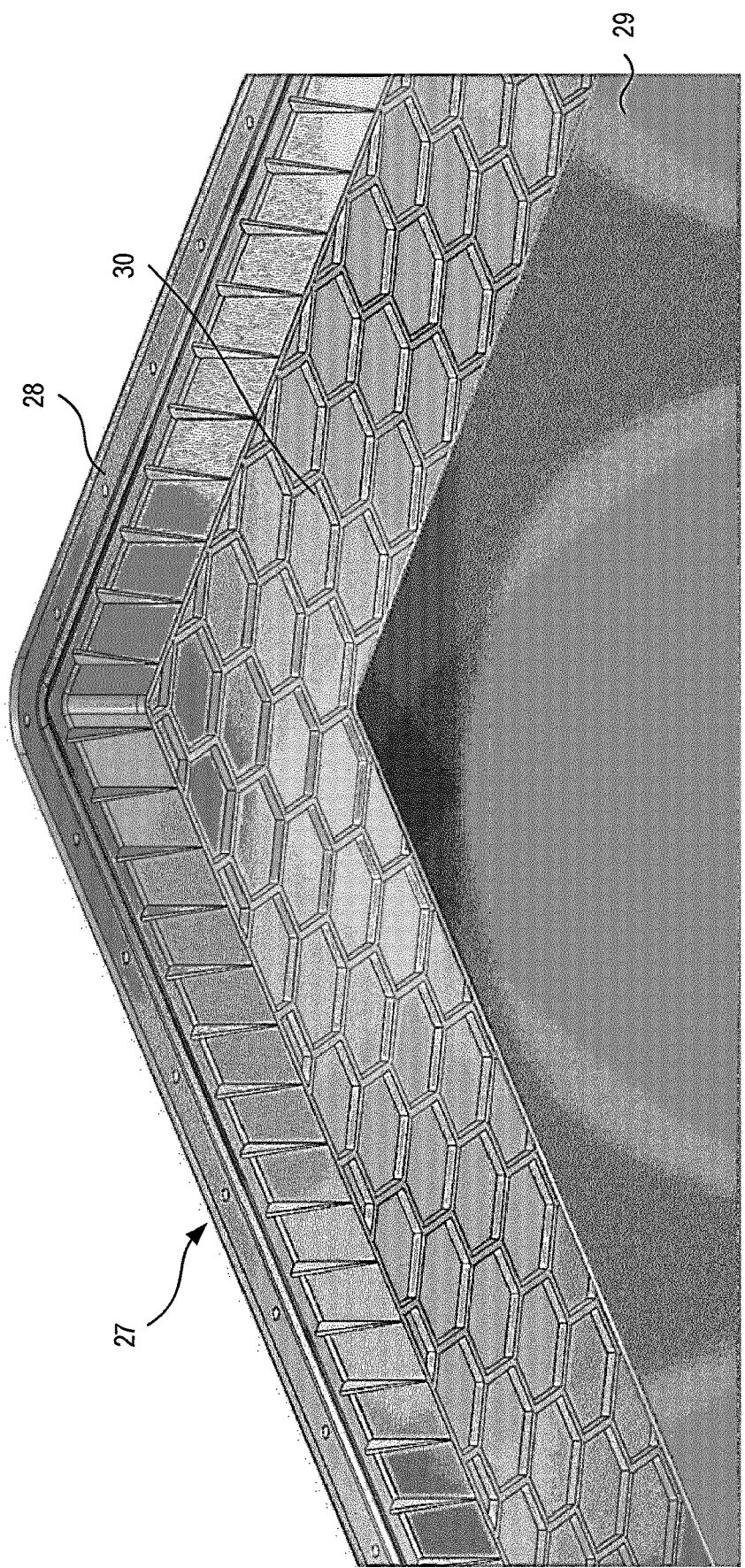
FIGS. 10A and 10B illustrates different embodiments of a bottom cover suitable for a battery assembly suitable for a xElectric Vehicle (xEV) according to various examples.
Figure 10B:
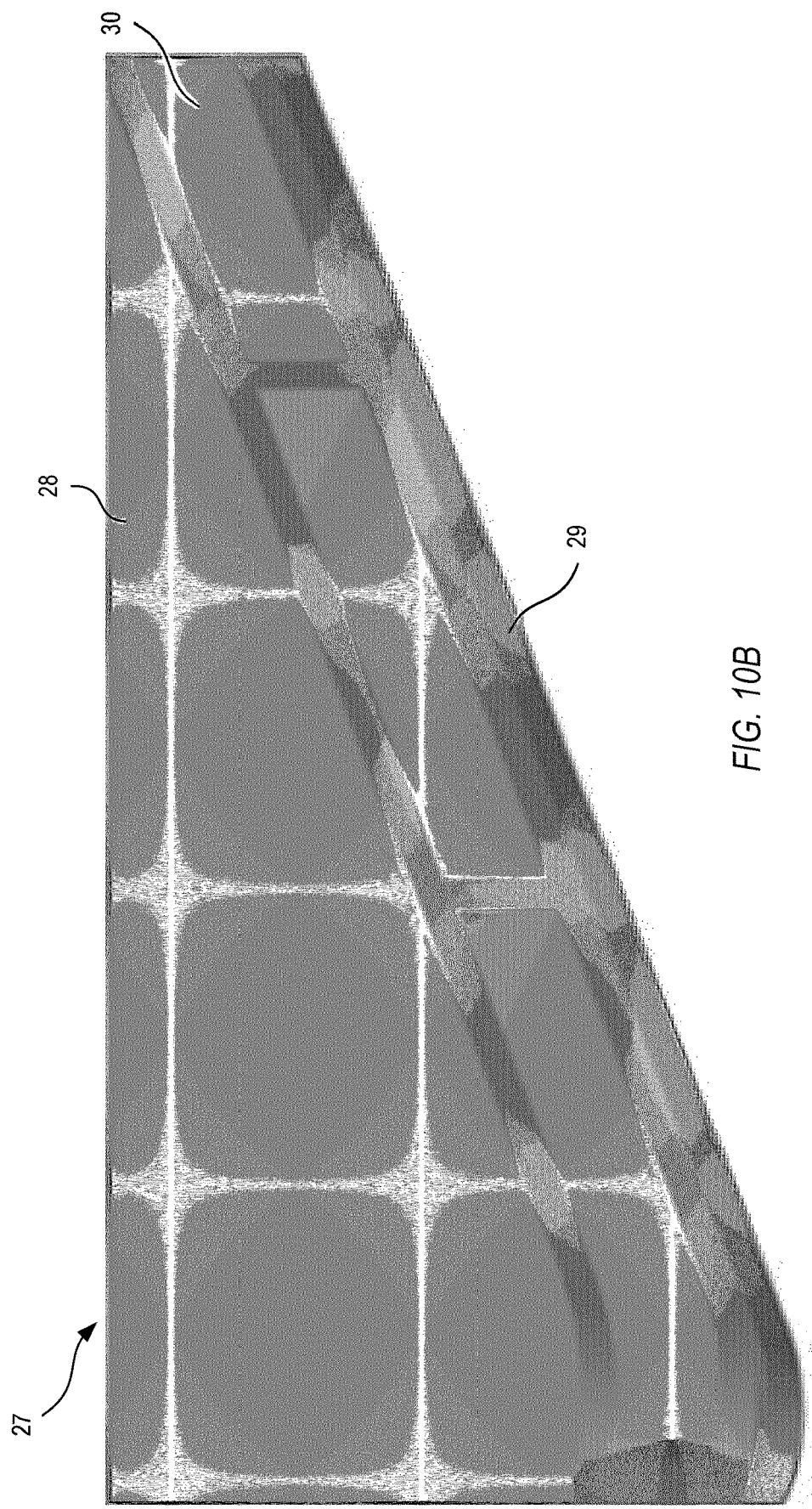
Figure 11:
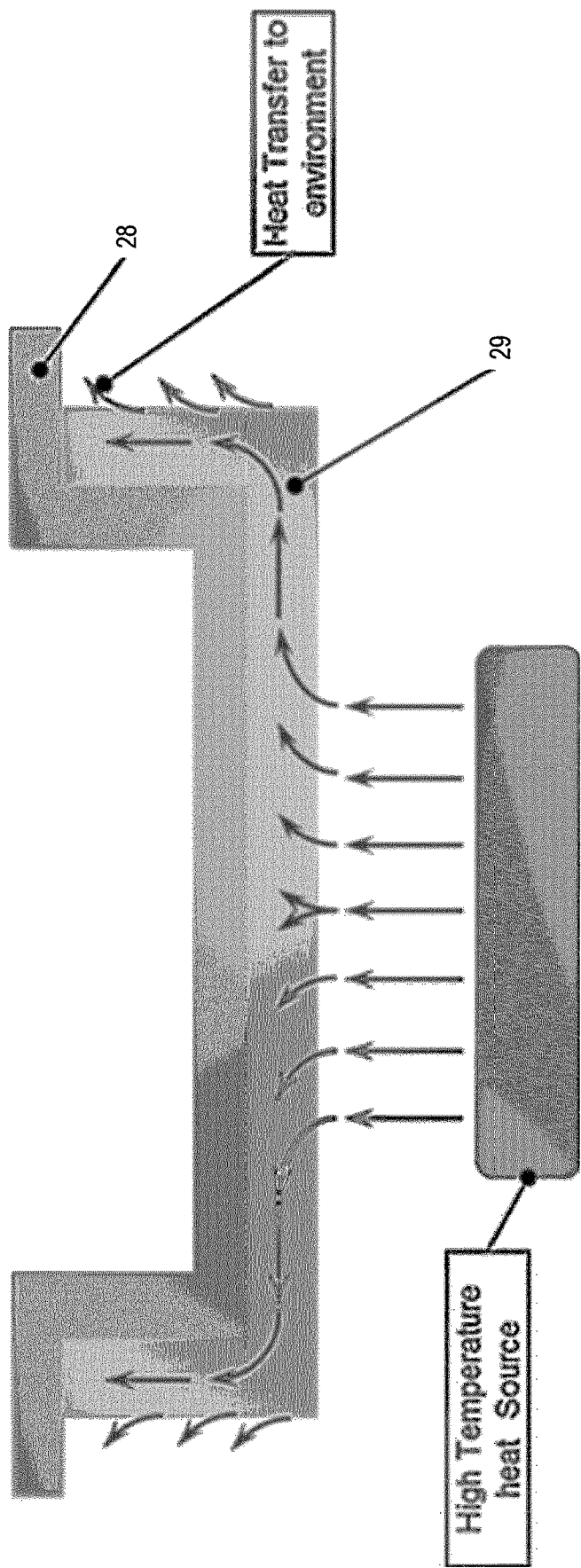
FIG. 11 is a schematic showing heat transfer using the hybrid metal cover shown in FIG. 10.

FIGS. 10A and 10B illustrates different embodiments of a bottom cover suitable for a battery assembly suitable for a xElectric Vehicle (xEV) according to various examples. For the bottom cover, a plastic-metal hybrid solution is selected consisting of a metallic plate 29 adhesively bonded to an injection molded plastic (28). Although selection of the correct adhesive is important, commercial solutions exist.

The metallic cover is shown cut away in FIG. 10A so the alveolar detail of the thermoplastic part (28) can be shown. The stack-up is illustrated in FIG. 10B, which is a cross-section of the part in 10B. In some embodiments, show in FIG. 10A, the thermoplastic part (28) of the bottom cover has alveolar structural portion (30) that is a honeycomb shape. The alveolar structural portion can define a series of columns disposed in parallel fashion to one another, as such defining a twin wall in the bottom cover.

The bottom cover (27) may comprise at least a thermoplastic part (28) assembled to a metallic plate (29) which is exposed to the road, in order to form a hybrid bottom cover (27) configured to protect the assembly from projections and obstacles from the road. The metallic plate can provide EMI shielding from outside of the vehicle. The bottom cover can be fastened along the frame of the battery pack with fasteners, adhered, or otherwise coupled, similar to the top cover.

The alveolar structural portion (30) can allow for reduced heat propagation from the battery pack module (7B) and/or the thermal management system (25) to others part members of the electric vehicle battery assembly. In addition to protecting the assembly (17) from obstacles and projection from the road, the metallic plate (29) in the hybrid bottom cover is able to conduct heat in plane, i.e. longitudinally, while the thermoplastic part (28) reduces conduction of heat into the battery this is important as: it minimizes local hot or cold spots during operation and in the event of a flame or ignition source it spreads the energy on a larger surface.

In some embodiments, the top cover (24) comprises ribs (31) and/or edges (31) in order to increase its stiffness. The top cover (24) can be injection molded from a flame retardant glass fiber filled polyolefin.

In some embodiments, top cover is in thermoplastic material, composite and or metal. One or more of the lid (9), bottom enclosure (8), top cover (24) and bottom cover (24) can be formed of a material having a dK/dF selected for radio compatibility, conductive compatibility or other some other electromagnetic compatibility. This can protect vehicle electronics and/or electronics within the battery pack from EMI. EMI shielding can also be obtained by over molding a metallic member with a polymer to form such a component. In examples where the top cover is formed as such, it can be bolted along the frame of the battery pack with an elastomer seal to ensure pressure sealing. Alternatively, it can also be adhesively bonded with frame using two sided adhesive tape.

In some embodiments, some or all the thermoplastic material parts of the assembly may comprise one or more of the following: additives and/or stabilizers like anti-oxidants, UV stabilizers, pigments, dyes, adhesion promoters, and a flame retardant e.g. mixture of an organic phosphate compound (for example piperazine pyrophosphate, piperazine polyphosphate and combinations thereof), an organic phosphoric acid compound (for example phosphoric acid, melamine pyrophosphate, melamine polyphosphates, melamine phosphate) and combinations thereof, and zinc oxide, and/or a filler, e.g., fibers. For example, a fiber-filled polyolefin can be used. Possible fiber material may include at least one of glass, carbon, aramid, or plastic, preferably glass. The fiber length can be chopped, long, short, or continuous. In particular, long glass fiber-filled polypropylene (STAMAX™) maybe used. Long fibers are defined to have an initial fiber length, so before molding, of at least 3 mm.

Another embodiment of the invention is a xEV comprising a battery assembly as describe above.

The present application describes various technical features and advantages with reference to the FIGS. and/or to various embodiments. One skilled in the art will understand that the technical features of a given embodiment may in fact be combined with features of another embodiment unless the opposite is explicitly mentioned or if it is obvious that these features are incompatible and that the combination does not provide a solution to at least one of the technical problems mentioned in the present application. Further, the technical features described in a given embodiment may be isolated from the other features of this embodiment unless the opposite is explicitly mentioned.

It should be obvious for persons skilled in the art that the present invention allows embodiments in many other specific forms without departing from the field of application of the invention as claimed. Therefore, the present embodiments have to be considered as an illustration, but may be modified in the field defined by the scope of the appended claims, and the invention should not be limited to the details given above.

What is claimed is:

1. A battery pack module (B), comprising:
    a battery that comprises at least one battery cell, connectors and heat exchanger means, and
    a battery housing that comprises:
        a bottom enclosure that comprises a base and an upstanding peripheral wall, the bottom enclosure configured to contain the battery;
        a lid configured to cap the bottom enclosure; and
        fixation means for maintaining the lid on the bottom enclosure in order to close the battery housing,
    characterized in that the lid comprises:
        at least one protrusion positioned in order to press the battery towards the center of the module when the battery is contained inside the bottom enclosure and the lid is covering the bottom enclosure and retained by the fixation means inside the battery housing, wherein the at least one protrusion is in direct contact with the upstanding peripheral wall of the bottom enclosure,
        wherein the coupled lid and bottom enclosure are configured to reduce the inner volume of the bottom enclosure available to the battery, and apply pressure to the battery toward the center of the battery pack module, wherein the pressure results in a compression force.

2. The battery pack module according to claim 1, wherein the battery housing comprises
    thermal transfer means configured to dissipate heat coming from the battery to an external environment of the battery pack module.

3. The battery pack module according to claim 1, wherein the upstanding peripheral wall of the bottom enclosure is either twin walled or single walled.

4. The battery pack module according to claim 1, wherein the bottom enclosure comprises
    heat exchanger means, for the connectors in order to secure the battery inside the battery pack.

5. The battery pack module according to claim 1, wherein a seal means is placed between the lid and the bottom enclosure in order to achieve a seal.

6. The battery pack module according to claim 1, wherein the battery housing is made of thermoplastic material.

7. The battery pack module according to claim 1, wherein the battery pack module comprises
    a negative terminal and a positive terminal accessible from outside of the housing in order to use the battery pack module as a standalone power source supply.

8. An electric vehicle battery assembly comprising:
    a battery pack module comprises:
        a battery that comprises at least one battery cell, connectors and heat exchanger means, and
        a battery housing that comprises:
            a bottom enclosure that comprises a base and an upstanding peripheral wall, the bottom enclosure configured to contain the battery;
            a lid configured to cap the bottom enclosure; and
            fixation means for maintaining the lid on the bottom enclosure in order to close the battery housing,
        characterized in that the lid comprises:
            at least one protrusion positioned in order to press the battery towards the center of the module when the battery is contained inside the bottom enclosure and the lid is covering the bottom enclosure and retained by the fixation means inside the battery housing, adjacent to the wall of the bottom enclosure wherein the at least one protrusion is in direct contact with the upstanding peripheral wall,
            wherein the coupled lid and bottom enclosure are configured to reduce the inner volume of the bottom enclosure available to the battery, and apply pressure to the battery toward the center of the battery pack module, wherein the pressure results in a compression force;
    a frame configured to maintain at least the battery pack module;
    a top cover; and
    a bottom cover.

9. The electric vehicle battery assembly according to claim 8, wherein the assembly comprises
    a thermal management system.

10. The battery vehicle battery assembly according to claim 8, wherein the frame comprises
    shock and impact absorption means.

11. The battery vehicle battery assembly according to claim 10, wherein
    the shock and impact absorption means are thermoplastic alveolar structural parts, metallic crush elements, and/or structural foams.

12. The battery vehicle battery assembly according to claim 8, wherein
    the bottom cover comprises a thermoplastic part assembled to a metallic plate which is exposed to the road.

13. The battery vehicle battery assembly according to claim 12, wherein
    the thermoplastic part of the bottom cover has an alveolar structural portion that comprises columns that extend between the top and bottom cover or in parallel fashion to the top and/or bottom cover.

14. The battery vehicle battery assembly according to claim 8, wherein
    the top cover comprises ribs to increase stiffness of the top cover.

15. A vehicle comprising:
    a battery pack module that comprises:
        a battery that comprises at least one battery cell, connectors and heat exchanger means, and
        a battery housing that comprises:
            a bottom enclosure that comprises a base and an upstanding peripheral wall, the bottom enclosure configured to contain the battery;
            a lid configured to cap the bottom enclosure; and
            fixation means for maintaining the lid on the bottom enclosure in order to close the battery housing, characterized in that the lid comprises:
   at least one protrusion positioned in order to press the battery towards the center of the module when the battery is contained inside the bottom enclosure and the lid is covering the bottom enclosure and retained by the fixation means inside the battery housing, wherein the at least one protrusion is in direct contact with the upstanding peripheral wall of the bottom enclosure,
wherein the coupled lid and bottom enclosure are configured to reduce the inner volume of the bottom enclosure available to the battery, and apply pressure to the battery toward the center of the battery pack module, wherein the pressure results in a compression force.

16. The vehicle of claim 15 wherein
the vehicle further comprises
a frame that comprises spars configured to maintain at least the battery pack module;
a top cover; and
a bottom cover,
wherein the battery pack module, the frame, the top cover and the bottom cover are part of a battery pack assembly.

17. The electric vehicle battery assembly of claim 8 wherein
   the frame comprises spars configured to maintain at least the battery pack module.

18. The battery pack module of claim 1 wherein
   the at least one protrusion is directed toward the base of the bottom enclosure, and is in contact with at least a portion of the bottom enclosure wall when the lid is closing the housing.

19. The battery pack module according to claim 18, wherein
   the at least the portion of the bottom wall comprises at least one rib extending toward the center of the housing, with which the at least one protrusion of the lid is in contact when the lid is closing the housing in order to press the cells of the battery towards the center of the assembly or module.

20. The battery pack module according to claim 19, wherein
   a shape of the at least the portion of the bottom wall and the at least one protrusion are complementary in order to facilitate the closing and locking of the housing.

* * * * *